United States Patent
Morita et al.

(10) Patent No.: US 6,464,867 B1
(45) Date of Patent: Oct. 15, 2002

(54) APPARATUS FOR PRODUCING WATER CONTAINING DISSOLVED OZONE

(75) Inventors: Hiroshi Morita, Hadano; Osamu Ota, Kuki; Tetsuo Mizuniwa, Yokosuka; Kazumi Tsukamoto, Saitama, all of (JP)

(73) Assignee: Kurita Water Industries Ltd., Tokyo (JP)

( * ) Notice: Subject to any disclaimer, the term of this patent is extended or adjusted under 35 U.S.C. 154(b) by 0 days.

(21) Appl. No.: 09/958,890

(22) PCT Filed: Mar. 24, 2000

(86) PCT No.: PCT/JP00/01823

§ 371 (c)(1),
(2), (4) Date: Oct. 12, 2001

(87) PCT Pub. No.: WO00/64568

PCT Pub. Date: Nov. 2, 2000

(30) Foreign Application Priority Data

Apr. 27, 1999 (JP) .............................. 11-119939
Jul. 26, 1999 (JP) .............................. 11-211290

(51) Int. Cl.[7] .............................. C02F 1/78; C02F 1/32; C02F 1/44
(52) U.S. Cl. .................. 210/202; 210/205; 210/638; 210/652; 210/748; 210/750; 210/760; 210/765; 210/900; 210/650
(58) Field of Search .................. 210/202, 205, 210/638, 650, 652, 748, 760, 765, 750, 900

(56) References Cited

U.S. PATENT DOCUMENTS 4,595,498 A * 6/1986 Cohen et al.
5,447,640 A * 9/1995 Omi et al.

FOREIGN PATENT DOCUMENTS

| JP | 09-192658 A | 7/1997 |
| JP | 09-253507 A | 9/1997 |
| JP | 10-309450 A | 11/1998 |
| JP | 11-029795 A | 2/1999 |
| JP | 11-057417 | * 3/1999 |
| JP | 11-099394 A | 4/1999 |
| JP | 11-138181 | 5/1999 |
| JP | 11-138182 | * 5/1999 |

* cited by examiner

Primary Examiner—Thomas M. Lithgow
(74) Attorney, Agent, or Firm—Frishauf, Holtz, Goodman & Chick, P.C.

(57) ABSTRACT

An apparatus for producing water containing dissolved ozone which comprises (A) a piping for supplying ultrapure water through which ultrapure water is supplied, (B) a catalytic reaction portion which is connected with the piping for supplying ultrapure water and in which the ultrapure water is brought into contact with an oxidation-reduction catalyst, (C) a filtration apparatus by which the ultrapure water treated in the catalytic reaction portion is filtered and (D) an apparatus for dissolving ozone in which ozone is dissolved into the ultrapure water discharged from the filtration apparatus; and an apparatus for producing water containing dissolved ozone which comprises an apparatus for producing ultrapure water which is equipped with an apparatus for irradiating with ultraviolet light, an apparatus for dissolving ozone in which ozone is dissolved into the ultrapure water produced in the apparatus for producing ultrapure water and a catalytic reaction portion which is packed with an oxidation-reduction catalyst and disposed between the apparatus for irradiating with ultraviolet light and the apparatus for dissolving ozone. Substances promoting decomposition of ozone which are contained in ultrapure water in very small amounts are removed and water containing dissolved ozone which shows little decrease in the concentration of ozone and has a great residual fraction of ozone dissolved in water after transportation for a long distance can be obtained.

22 Claims, 6 Drawing Sheets

WATER CONTAINING DISSOLVED OZONE

FIG.7

WATER CONTAINING DISSOLVED OZONE

FIG.8

APPARATUS FOR PRODUCING WATER CONTAINING DISSOLVED OZONE

TECHNICAL FIELD

The present invention relates to an apparatus for producing water containing dissolved ozone. More particularly, the present invention relates to an apparatus for removing substances promoting decomposition of ozone which are contained in ultrapure water in very small amounts and providing water containing dissolved ozone which shows little decrease in the concentration of ozone and has a great residual fraction of ozone dissolved in water after transportation for a long distance.

BACKGROUND ART

For achieving excellent quality and high yields of products of electronic materials such as silicon substrates for semiconductors, glass substrates for liquid crystals and quartz substrates for photomasks, it is important that foreign substances are removed from the surface of the electronic materials. Wet washing is widely conducted for this purpose. Application of a washing fluid having a strong oxidizing ability is effective for removing organic and metal contaminants. Washing at a high temperature with a mixed solution of sulfuric acid and hydrogen peroxide (the SMP washing liquid) or a mixed solution of hydrochloric acid, hydrogen peroxide and ultrapure water (the SC2 washing liquid) has heretofore been conducted.

It is required recently that the washing be conducted in accordance with a simplified process using less materials at the room temperature. Therefore, water containing dissolved ozone which exhibits very strong oxidizing ability and effectively removes organic and metal contaminants on the surface of electronic materials even when the concentration of ozone is several mg/liter is being used for wet washing. Water containing dissolved ozone is characterized in that the water provides ordinary high purity water when the dissolved ozone is decomposed. However, since the dissolved ozone is decomposed with time and converted into oxygen, it has been considered to be difficult that the concentration of ozone is maintained well and water containing dissolved ozone is transported for a long distance through a piping. Therefore, water containing dissolved ozone is prepared in the vicinity of a cleaning apparatus and used immediately after being prepared.

Figure 1:
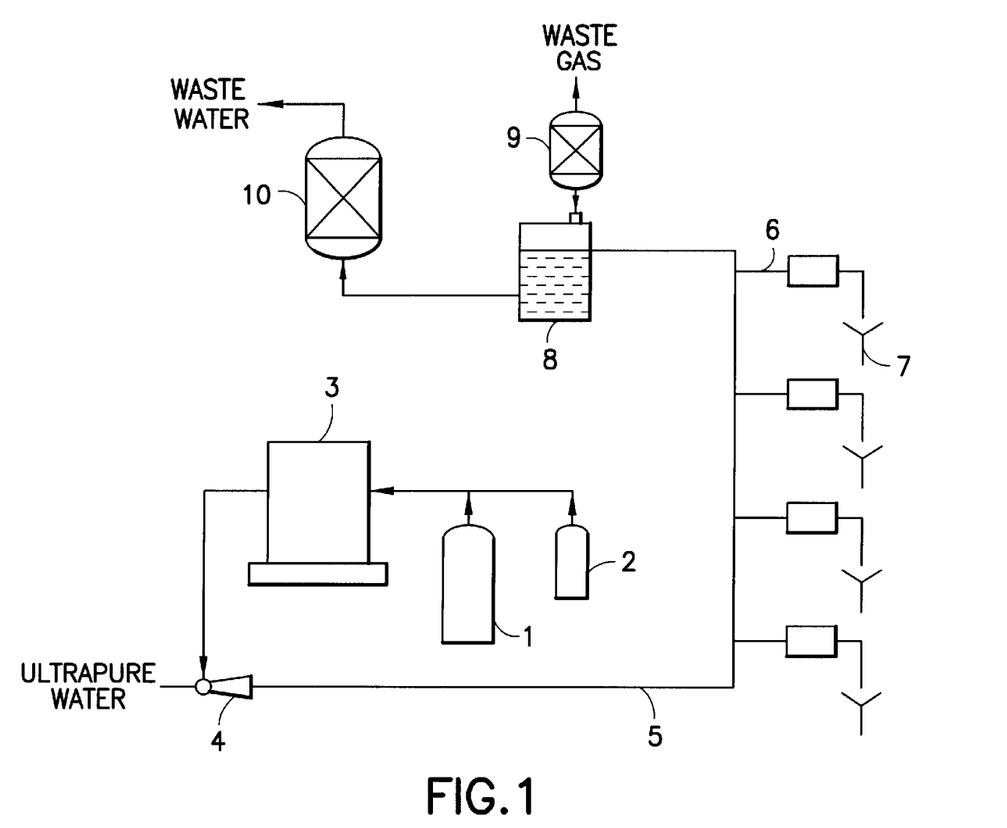
FIG. 1 shows a flow diagram of an apparatus for supplying water containing dissolved ozone which transports the water containing dissolved ozone in the condition of a gas-liquid mixture.

It was found by the present inventors that the decrease in the concentration of ozone was suppressed and water containing dissolved ozone could be transported for a long distance when ultrapure water was transported while a gas containing ozone was mixed with the ultrapure water in a piping for the transportation. An apparatus for supplying water containing dissolved ozone shown in FIG. 1 is proposed in Japanese Patent Application Laid-Open No. Heisei 11-138181. Oxygen gas from a container of oxygen gas 1 is mixed with a very small amount of nitrogen gas from a container of nitrogen gas 2. The resultant mixed gas is introduced into an ozone generator 3 of the silent discharge type and a mixed gas of ozone and oxygen gas is produced. The produced mixed gas is introduced into ultrapure water in an apparatus for dissolving ozone 4 using an ejector or a pump. The ultrapure water has been prepared using an ion exchange apparatus, a membrane apparatus, an apparatus for irradiating with ultraviolet light and other necessary apparatuses. The mixed gas of ozone and oxygen gas is mixed with the ultrapure water and a product in the condition of a gas-liquid mixture is formed. Ozone is dissolved into water in the product and water containing dissolved ozone is formed. The product flows through a piping for transporting a gas-liquid mixed fluid 5 while remaining in the condition of a gas-liquid mixture. Although ozone dissolved in water is converted into oxygen gas by spontaneous decomposition, the amount of ozone decreased due to the spontaneous decomposition is supplemented with ozone dissolved into the water phase from the gas phase and the concentration of ozone can be kept approximately constant. The water containing dissolved ozone is taken out of branched pipes 6, subjected to gas-liquid separation and consumed at points of use 7. The water containing dissolved ozone which is present in an excessive amount and not taken out of the branched pipes is introduced into a gas-liquid separator 8 and separated into the gas phase and the water phase. Ozone in the gas phase is decomposed in an apparatus for decomposing ozone 9 and ozone in the water phase is decomposed in an apparatus for decomposing ozone 10. After the decomposition of ozone has been completed, the gas phase is released to the atmosphere as a waste gas and the water phase is recovered as waste water and reused after necessary treatments.

When the above apparatus for supplying water containing dissolved ozone is used, change in the concentration of ozone during transportation is small even when the water containing dissolved ozone is transported for a long distance and water containing dissolved ozone in an approximately constant concentration can be supplied to points of use. However, ozone is required in an excessive amount in this apparatus since the amount of ozone in the water containing dissolved ozone decreased due to the spontaneous decomposition is supplemented with ozone dissolved into the water phase from the gas phase. Therefore, water containing dissolved ozone in which decomposition of ozone is suppressed and which shows little decrease in the concentration of ozone and has a great residual fraction of ozone dissolved in water after transportation for a long distance is required.

The present invention has a object of providing an apparatus for producing water containing dissolved ozone which can provide water containing dissolved ozone which shows little decrease in the concentration of ozone and has a great residual fraction of ozone dissolved in water after transportation for a long distance.

DISCLOSURE OF THE INVENTION

As the result of intensive studies by the present inventors to achieve the above object, it was found that the decrease in the concentration of ozone took place due to the presence of very small amounts of substances promoting decomposition of ozone in ultrapure water used as the material water for water containing dissolved ozone, the substances in very small amounts were effectively removed by bringing the substances into contact with an oxidation-reduction catalyst and the substances in very small amounts were formed by excessive irradiation with ultraviolet light in the process for producing ultrapure water. The present invention has been completed based on the knowledge.

The essence of the present invention is to remove very small amounts of substances promoting decomposition of ozone from ultrapure water supplied to an apparatus for dissolving ozone by bringing at least one of the ultrapure water supplied to the apparatus for dissolving ozone and the water used in the process of producing ultrapure water into contact with an oxidation-reduction catalyst.

The present invention provides:

(1) An apparatus for producing water containing dissolved ozone which comprises (A) a piping for supplying ultrapure water through which ultrapure water is supplied, (B) a catalytic reaction portion which is connected with the piping for supplying ultrapure water and in which the ultrapure water is brought into contact with an oxidation-reduction catalyst, (C) a filtration apparatus by which the ultrapure water treated in the catalytic reaction portion is filtered and (D) an apparatus for dissolving ozone in which ozone is dissolved into the ultrapure water discharged from the filtration apparatus; and (2) An apparatus for producing water containing dissolved ozone which comprises an apparatus for producing ultrapure water which is equipped with an apparatus for irradiating with ultraviolet light, an apparatus for dissolving ozone in which ozone is dissolved into the ultrapure water produced in the apparatus for producing ultrapure water and a catalytic reaction portion which is packed with an oxidation-reduction catalyst and disposed between the apparatus for irradiating with ultraviolet light and the apparatus for dissolving ozone.

The phenomena as the basis of the present invention will be described in the following. When water containing dissolved ozone is produced by dissolving ozone into ultrapure water produced by an apparatus for producing ultrapure water equipped with an apparatus for irradiating with ultraviolet light, it occurs occasionally that ozone dissolved in water shows a great rate of spontaneous decomposition and the concentration of ozone rapidly decreases. As the result of studies on the cause of this phenomenon, it was found that the rate of spontaneous decomposition of ozone increases when the amount of ultraviolet light used for the irradiation is more than necessary. When ultraviolet light is used in an amount more than necessary for decomposing organic carbons (TOC), ultraviolet light works on water molecules in addition to TOC to be decomposed and OH radical and H radical are formed. Although these radicals form the water molecule by recombination, it is estimated that radical substances continue to be present for a while as intermediates for the recombination and promote the decomposition of ozone.

In the production of ultrapure water, target values are set as the quality of ultrapure water to be produced and, in general, TOC is included as one of the target values. When fluctuation in the concentration of organic substance residual in the primary pure water is considered, it is advantageous for the process control that the amount of ultraviolet light used for the irradiation is set at an excessive amount so that the target value of TOC can be achieved even when the concentration of TOC has the maximum value in the estimated range of fluctuation. Irradiation with ultraviolet light in an excessive amount may be prevented by adjusting the amount of ultraviolet light used for the irradiation in accordance with the fluctuation in TOC in the primary pure water. However, there is the possibility that the facilities and the process control become complicated. When water obtained after irradiation with ultraviolet light is brought into contact with an oxidation-reduction catalyst using the apparatus of the present invention, the decomposition of ozone dissolved in water can be suppressed. Therefore, the irradiation with ultraviolet light can be conducted always in an excessive amount so that TOC in the primary pure water can be sufficiently decomposed and stability of water containing dissolved ozone can be improved without major change in the existing apparatus for producing water containing dissolved ozone. The mechanism of the improvement in stability of water containing dissolved ozone by the apparatus of the present invention is not fully elucidated. It is considered that the OH radical and the H radical generated in the water by irradiation with ultraviolet light in an excess amount and radical substances present as intermediates in recombination of these radicals to form the water molecule are rapidly converted into the water molecule by the contact with the oxidation-reduction catalyst and disappear.

BRIEF DESCRIPTION OF THE DRAWINGS

FIG. 9($a$) and FIG. 9($b$) show flow diagrams of embodiments of the apparatus of the present invention in which a catalytic reaction portion and a filtration apparatus are disposed as subsystems of the apparatus for producing ultrapure water.

The numbers and the mark in the Figures have meanings as follows: 1: a container of oxygen gas; 2: a container of nitrogen gas; 3: an ozone generator; 4: an apparatus for dissolving ozone; 5: a piping for transporting a gas-liquid mixed fluid; 6: a branched pipe; 7: a point of use; 8: a gas-liquid separator; 9 and 10: apparatuses for decomposing ozone; 11: a pretreatment system; 12: a primary pure water system; 13: a subsystem; 14: a plant for producing semiconductors; 15: a recovery system; 16: a coagulation apparatus; 17: a double layer filtration apparatus; 18: a reverse osmosis apparatus; 19: a degassing apparatus; 20: an ion exchange apparatus; 21: an apparatus for irradiating with ultraviolet light; 22: an ion exchange apparatus of the mixed bed type; 23: an ultrafiltration apparatus; 24: an active carbon adsorption apparatus; 25: an ion exchange apparatus; 26: an apparatus for irradiating with ultraviolet light; 27: a pump for transporting ultrapure water; 28: a piping for supplying ultrapure water; 29: a catalytic reaction portion; 30: a filtration apparatus; 31: an apparatus for dissolving ozone; 32: an ozone generator; 33: a gas-liquid separator; 34: a tank of a chemical agent; 35: a pump for a chemical agent; 36: a measuring instrument; 37: a tank of ultrapure water; 38: a piping for recycling ultrapure water; 39: a resin supporting palladium; 40: a cation exchange resin; 41: an anion exchange resin; 42: a column packed with a resin supporting palladium; 43: a column of a mixed bed; 44: an ejector; 45: an in-line mixer; 46: a portion for promoting dissolution of ozone and growth of bubbles by combination; 47: a gas transmission membrane; 48: a module of a gas transmission membrane; 49: an oxidation-reduction catalyst; and A: an apparatus for producing ultrapure water.

THE MOST PREFERRED EMBODIMENT TO CARRY OUT THE INVENTION

The most preferred embodiment of the apparatus for producing water containing dissolved ozone comprises (A)

a piping for supplying ultrapure water through which ultrapure water is supplied, (B) a catalytic reaction portion which is connected with the piping for supplying ultrapure water and in which the ultrapure water is brought into contact with an oxidation-reduction catalyst, (C) a filtration apparatus by which the ultrapure water treated in the catalytic reaction portion is filtered and (D) an apparatus for dissolving ozone in which ozone is dissolved into the ultrapure water discharged from the filtration apparatus.

Figure 2:
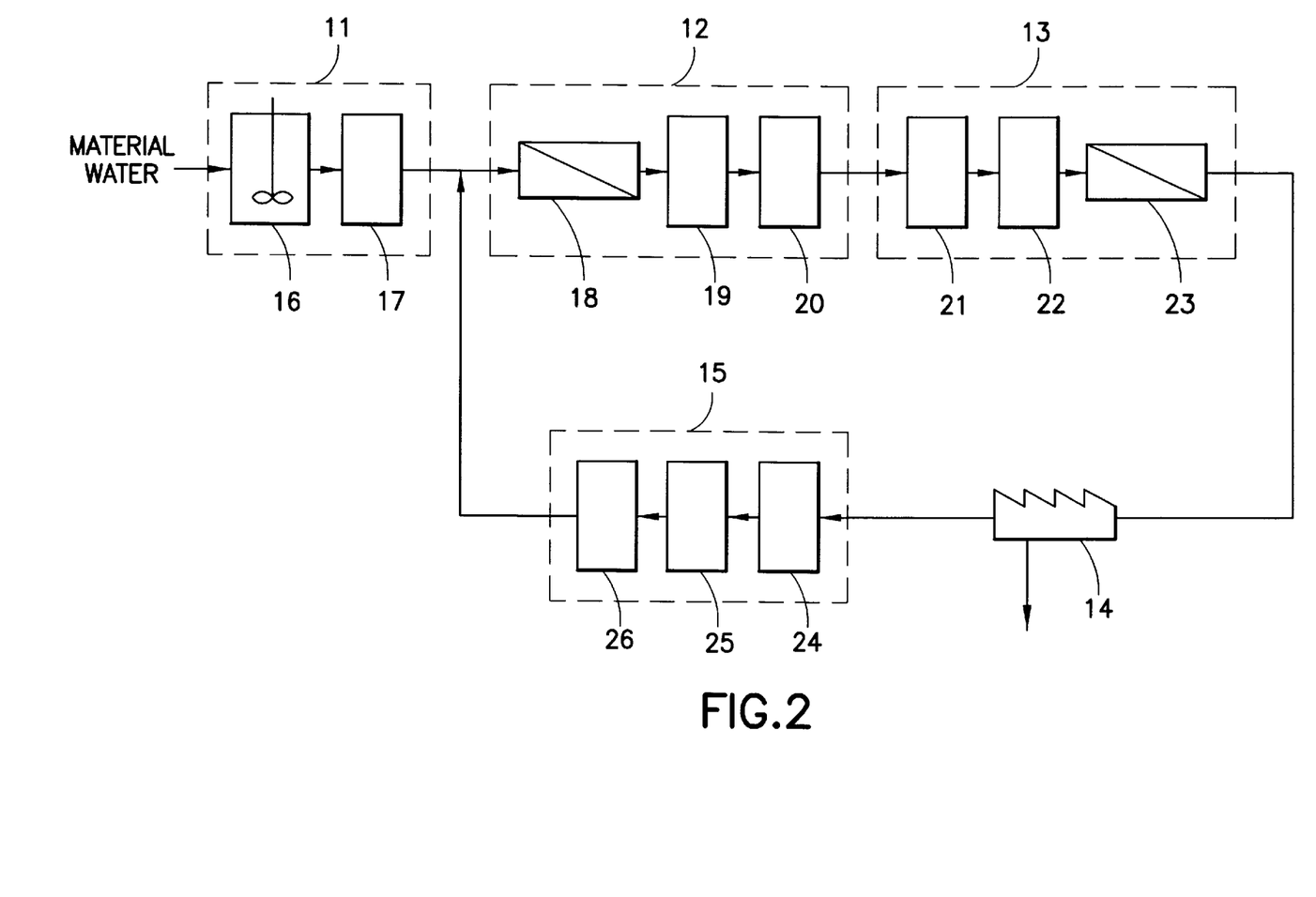
FIG. 2 shows a flow diagram of an embodiment of the system for producing ultrapure water.

Ultrapure water supplied to the apparatus for dissolving ozone is, as is well known, produced by an apparatus for producing ultrapure water constituted with various separation apparatuses arranged in a suitable order. FIG. 2 shows a flow diagram of an embodiment of the system for producing ultrapure water. In this system, ultrapure water produced by passing through a pretreatment system 11, a primary pure water system 12 and a subsystem 13 is used in a plant for producing semiconductors 14 and relatively clear waste Water obtained after the use is treated by a recovery system 15 and recycled to the primary pure water system.

The pretreatment system is a system for roughly removing suspended substances and dissolved substances from material water. Unit apparatuses such as apparatuses for coagulation and separation, filtration apparatuses, membrane filtration apparatuses, apparatuses for biological treatments, adsorption apparatuses and ion exchange apparatuses are suitably used in the system. In the system shown in FIG. 2, a coagulation apparatus 16 and a double layer filtration apparatus 17 are disposed.

The primary pure water system is a system mainly for removing dissolved salts from water treated by the pretreatment system. Typical examples of the desalting apparatus for removing salts in water include ion exchange apparatuses for producing pure water such as a two-bed three-column apparatus for producing pure water, a four-bed five-column apparatus for producing pure water, a mixed bed apparatus for producing pure water and continuous desalting apparatus of the electric regeneration type; and reverse osmosis desalting apparatuses such as a reverse osmosis membrane, a two-stage reverse osmosis membrane and a three-stage reverse osmosis membrane. As a degassing apparatus for removing dissolved gases, a decarbonation apparatus for removing carbon dioxide and a deoxidation apparatus for removing dissolved oxygen gas (DO) are disposed. As the degassing apparatus, a heat degassing apparatus, a vacuum degassing apparatus, a membrane degassing apparatus or a catalytic degassing apparatus is used. An apparatus for irradiating with ultraviolet light may be occasionally disposed for sterilization or for decomposition of a portion of organic substances (TOC) by oxidation. In the system shown in FIG. 2, a reverse osmosis apparatus 18, a degassing apparatus 19 and an ion exchange apparatus 20 are disposed.

The subsystem is a system called a secondary pure water system, in which residual salts, TOC, fine particles and microbes are thoroughly removed so that the quality of the water is further improved from that of water obtained in the primary pure water system and ultrapure water is obtained. In the subsystem, an apparatus for irradiating with ultraviolet light to decompose TOC by oxidation, an ion exchange apparatus and a membrane separation apparatus such as a microfiltration membrane apparatus (MF), an ultrafiltration membrane apparatus (UF) and a reverse osmosis membrane apparatus (RO) are disposed. In the system shown in FIG. 2, an apparatus for irradiating with ultraviolet light 21, an ion exchange apparatus of the mixed bed type 22 and an ultrafiltration apparatus 23 are disposed.

Into the ultrapure water produced in the subsystem, ozone is dissolved and, where necessary, suitable gasses are dissolved and suitable chemical agents are added. The produced water is used, for example, for washing electronic materials at points of use in a plant for producing semiconductors 14. In the recovery system, contaminating substances and chemical agents are removed from the washing water used at and discharged from the points of use and the treated water is recycled to the primary pure water system. In the system shown in FIG. 2, an active carbon adsorption apparatus 24, an ion exchange apparatus 25 and an apparatus for irradiating with ultraviolet light 26 are disposed. Hydrogen peroxide or the like agent may be occasionally added for promoting decomposition of the dissolved substances by oxidation in the apparatus for irradiating with ultraviolet light. The washing water which was not used in the points of use is recycled to the subsystem without any further treatments or after removal of dissolved gases.

By disposing the apparatus for irradiating with ultraviolet light and conducting the irradiation with ultraviolet light, TOC can be decomposed by oxidation or sterilization can be conducted. The apparatus for irradiating with ultraviolet light may occasionally be disposed in the primary pure water system but, in many cases, is disposed in the subsystem. By irradiation of pure water with ultraviolet light, TOC is decomposed into carbon dioxide gas or organic acids of low molecular weights and can be removed by adsorption with an anion exchange resin.

Figure 3:
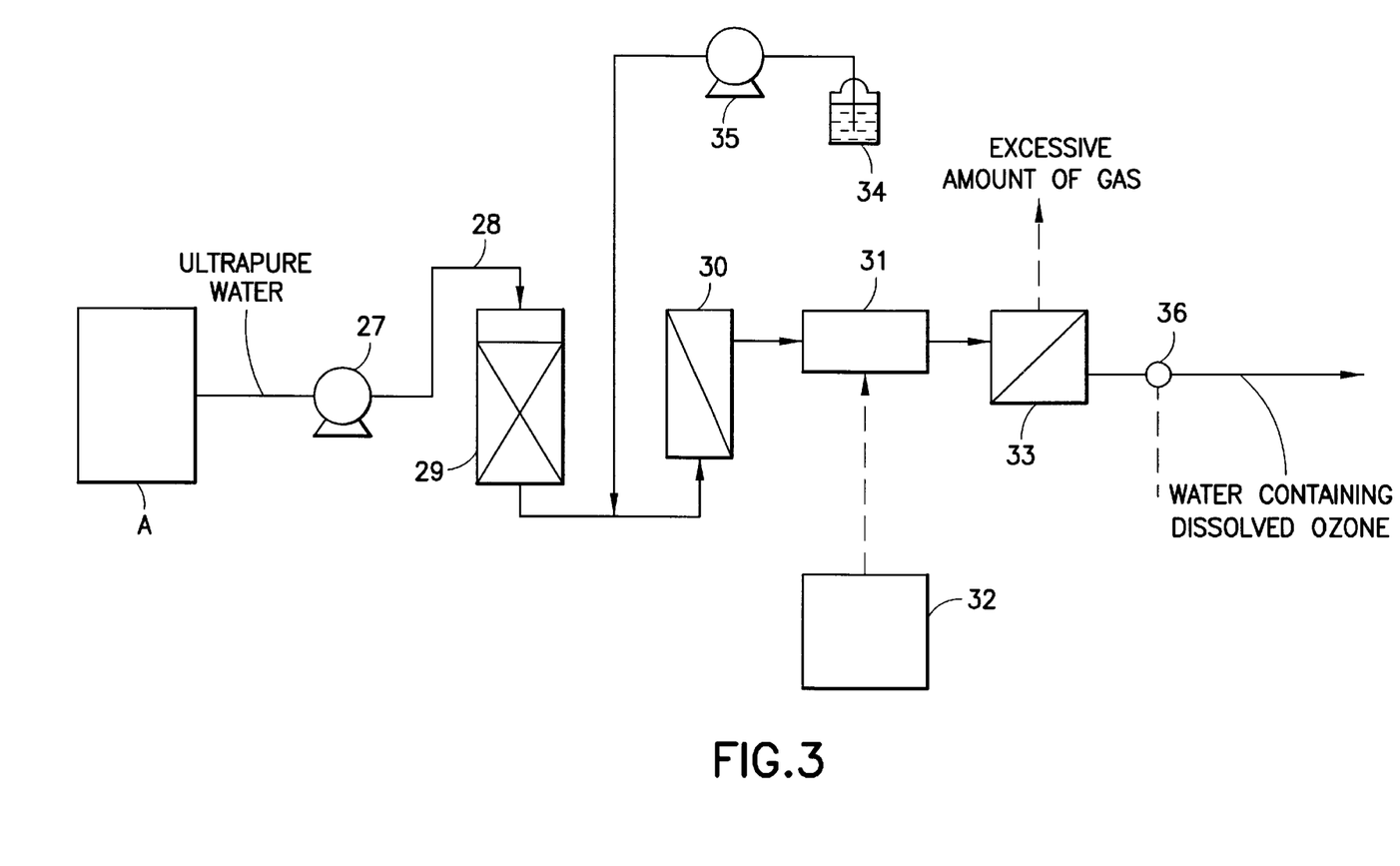
FIG. 3 shows a flow diagram of an embodiment of the apparatus of the present invention.

FIG. 3 shows a flow diagram of an embodiment of the apparatus of the present invention. In this embodiment, the ultrapure water produced in an apparatus for producing ultrapure water A is supplied to a piping for supplying ultrapure water 28 by a pump for transporting ultrapure water 27. The pump for transporting ultrapure water is not particularly limited. Examples of the pump for transporting ultrapure water include a piston pump, a plunger pump, a booster pump, a turbine pump and a volute pump. Among these pumps, the booster pump is preferable. For practical operation of the apparatus for producing water containing dissolved ozone, it is important that a suitable pressure is applied to the ultrapure water. When a gas containing ozone is introduced into the piping for transporting ultrapure water using an ejector, it is particularly necessary that the pressure of the supplied water be kept high. When the ultrapure water supplied to the apparatus has a sufficiently high pressure, any particular means for increasing the pressure is not necessary. However, since the pressure of the ultrapure water supplied to the apparatus is not sufficiently high in many cases, it is preferable that a pump for transporting ultrapure water is disposed at the inlet of the apparatus so that the pressure of the ultrapure water is increased. It is preferable that the pressure of the supplied ultrapure water is 0.2 to 0.5 MPa.

In the apparatus of the present invention, the piping for supplying ultrapure water 28 is connected to a catalytic reaction portion 29 in which ultrapure water is brought into contact with an oxidation-reduction catalyst. The oxidation-reduction catalyst used in the present invention is not particularly limited. Examples of the oxidation-reduction catalyst include platinum catalysts, silver catalysts and palladium catalysts. Among these catalysts, the palladium catalysts are preferably used. As the palladium catalyst, palladium metal, palladium oxides, palladium hydrides and catalysts obtaining supporting palladium on a support such as an ion exchange resin, alumina, active carbon and zeolite can be used. The form of the palladium catalyst is not particularly limited and the palladium catalyst in any form such as powder, granules and pellets can be used. When the catalyst is in the form of powder, a reactor may be used and the catalyst may be added into the reactor in a suitable amount. Alternatively, a reaction column may be used and the catalyst may be packed into the reaction column to form a fluidized bed through which water is passed. When the catalyst is in the form of granules or pellets, a reaction column may be packed with the catalyst to form a catalyst-packed column and water can be treated by continuously passing through the column. The catalyst-packed column is preferable since the catalyst does not flow out, the solid-liquid separation is not necessary and the operation is facilitated.

When a supported palladium catalyst is used, i.e., when a catalyst obtained by supporting palladium on a support is used, it is preferable that the amount of palladium supported on the support is 0.1 to 10% by weight. Among the supported palladium catalysts, supported palladium catalysts obtained by supporting palladium on anion exchange resins are preferable since an excellent effect is exhibited with a small amount of supported palladium. A resin supporting palladium, i.e., an anion exchange resin supporting palladium, can be prepared by packing a reaction column with the anion exchange resin, followed by passing an acidic solution of palladium chloride through the column. A resin supporting palladium metal can be prepared by adding a reducing agent such as formaline to the above reaction column and reducing the palladium compound. By bringing ultrapure water into contact with the oxidation-reduction catalyst at the catalytic reaction portion, substances contained in very small amounts in the ultrapure water and promoting decomposition of ozone can be removed. Examples of the substances contained in very small amounts and promoting decomposition of ozone include OH radical and H radical which are generated by decomposition of water in the apparatus for irradiating with ultraviolet light of the apparatus for producing ultrapure water.

In the apparatus of the present invention, the resin supporting palladium and an ion exchange resin can be used in combination in the column for packing with the catalyst. The manner of the combination of the resin supporting palladium and the ion exchange resin is not particularly limited. For example, a column for packing with the catalyst may be packed with a combination of the resin supporting palladium and a cation exchange resin or a combination of the resin supporting palladium, a cation exchange resin and an anion exchange resin as a mixture or as a laminate of layers. Alternatively, a column packed with the resin supporting palladium and a column packed with a cation exchange resin can be connected in series in this order, a column packed with the resin supporting palladium, a column packed with a cation exchange resin and a column packed with an anion exchange resin can be connected in series in this order or a column packed with the resin supporting palladium and a column having a mixed bed of a cation exchange resin and an anion exchange resin can be connected in series in this order. By using a combination of the resin supporting palladium and an ion exchange resin, palladium ion can be captured with the ion exchange resin even when an extremely small amount of palladium ion is eluted from the resin supporting palladium. Moreover, ion components eluted from the pump for transporting ultrapure water can be captured with the ion exchange resin even when such ion components are eluted. Therefore, the ultrapure water can be kept at a high purity.

In the apparatus of the present invention, the ultrapure water treated in the catalyst reaction portion is filtered by a filtration apparatus 30. The filtration membrane used for the filtration apparatus is not particularly limited. Examples of the filtration membrane include an ultrafiltration membrane (UF), a microfiltration membrane (MF) and a reverse osmosis membrane (RO). By filtering the ultrapure water by the filtration apparatus, fine particles derived from the pump for transporting ultrapure water, the resin supporting palladium, the cation exchange resin and the anion exchange resin can be removed and the ultrapure water can be kept at a high purity.

In the apparatus of the present invention, a gas containing ozone generated in an ozone generator 32 is supplied to an apparatus for dissolving ozone 31 and ozone is dissolved. The apparatus for dissolving ozone is not particularly limited. Examples of the apparatus for dissolving ozone include a module of a gas transmission membrane which is made of fluororesin and resistant to ozone, an ejector, an apparatus for sucking a gas containing ozone such as a pump for dissolving a gas and a bubbling apparatus. Among these apparatuses, the ejector is preferable due to easiness of the operation. Dissolution of ozone can be promoted by disposing an inline mixer at the downstream of the ejector so that fine bubbles are formed. When the ejector or the apparatus for dissolving a gas is used as the apparatus for dissolving ozone, the condition of a gas-liquid mixture is formed with water containing dissolved ozone and a gas containing ozone. Water containing dissolved ozone and containing no bubbles can be obtained by disposing a gas-liquid separator 33 at the down stream and separating an excessive amount of the gas. By inserting a suitable volume between the apparatus for dissolving ozone and the apparatus for gas-liquid separation so that the time of passage of water is increased, dissolution of ozone can be promoted and growth of fine bubbles by combination is also promoted to facilitate the gas-liquid separation. However, when the apparatus for dissolving ozone and the point of use are separated from each other by a long distance, it is preferable that the gas and the liquid are transported for the long distance in the condition of the gas-liquid mixture and the gas-liquid separation is conducted at a place close to the point of use. The spontaneous decomposition of ozone takes place in some extent during the transportation for the long distance although substances promoting decomposition of ozone have been removed and the spontaneous decomposition of ozone is suppressed. Therefore, the transportation in condition of the gas-liquid mixture is advantageous since the decreased amount of ozone is supplemented by ozone dissolved into the water from the gas phase.

The ozone generator used in the apparatus of the present invention is not particularly limited. Examples of the ozone generator include an apparatus for generating a mixed gas of ozone and oxygen gas by electrolysis of water and an apparatus for generating a mixed gas of ozone and oxygen gas by silent discharge or creeping discharge using oxygen gas as the material. For obtaining a high purity water containing dissolved ozone, it is preferable that a filter for capturing fine particles in the gas containing ozone is disposed between the ozone generator and the apparatus for dissolving ozone.

In the apparatus of the present invention, a tank of a chemical agent 34 and a pump for a chemical agent 35 are disposed. An inlet for a chemical agent is disposed at the upstream or the downstream of the filtration apparatus and a chemical agent such as an acid and an alkali can be introduced. The chemical agent may also be introduced under pressure with a inert gas such as nitrogen gas in place of introduction by the pump for a chemical agent. The decomposition of dissolved ozone can be suppressed by decreasing pH by introduction of an acid. From the standpoint of maintaining the concentration of dissolved ozone, it is preferable the acid is introduced at the upstream of the apparatus for dissolving ozone. The cleaning effect of the water containing dissolved ozone can be enhanced by increasing pH by introduction of an alkali. Examples of the alkali include ammonia and tetramethylammonium hydroxide. The concentration of dissolved ozone and pH of the water containing dissolved ozone produced by using the apparatus of the present invention can be measured by a measuring instrument 36 disposed in the piping. The quality of the water containing dissolved ozone can be controlled by adjusting the amount of the gas containing ozone supplied to the ultrapure water and the amount of the introduced chemical agents based on the concentration of dissolved ozone and pH obtained by the measurement. In the apparatus of the present invention, it is preferable that portions contacting liquids and portions contacting gases of the apparatus for dissolving ozone and the apparatuses at the downstream are constituted with a material resistant to ozone. Examples of the material resistant to ozone include fluororesins, quartz and metals having the surface in the passive state.

Figure 4:
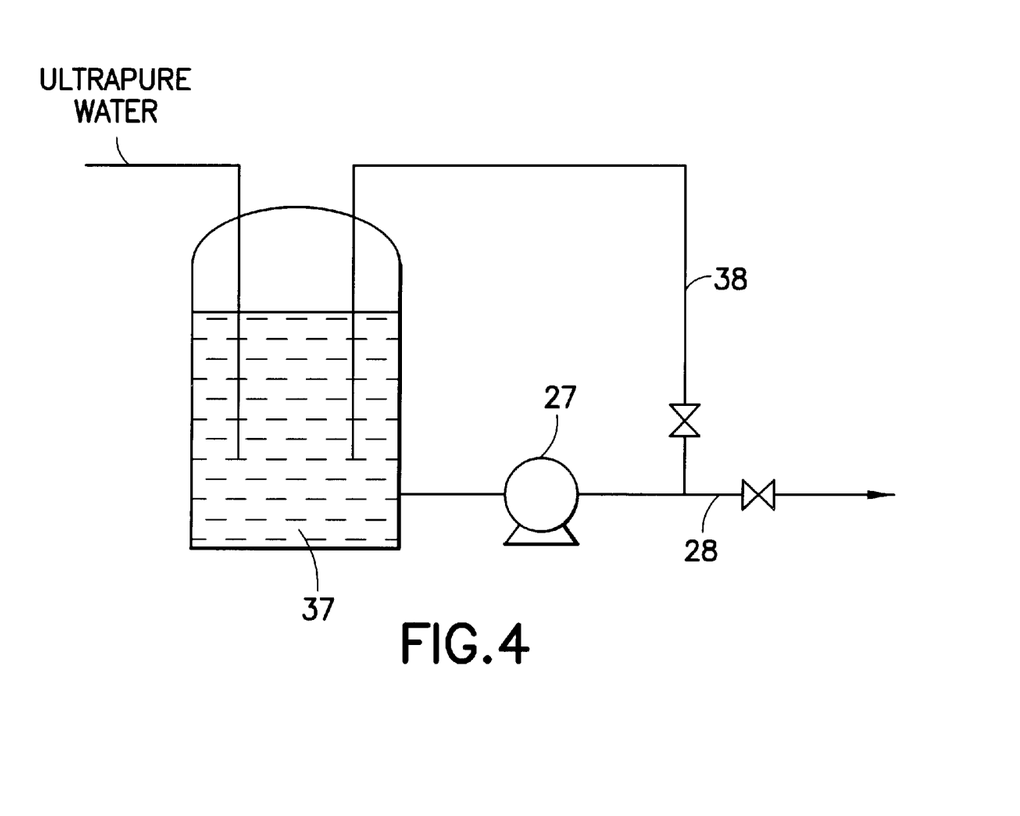
FIG. 4 shows a flow diagram of an embodiment of (A) the piping for supplying ultrapure water of the apparatus of the present invention.

FIG. 4 shows a flow diagram of an embodiment of (A) the piping for supplying ultrapure water of the apparatus of the present invention.

In the present embodiment, a tank of ultrapure water 37 is disposed. A piping for supplying Ultrapure water 28 is branched and a piping for recycling ultrapure water 38 is disposed. By recycling ultrapure water to the tank of ultrapure water through the disposed piping for recycling of ultrapure water, a pump for supplying ultrapure water 27 can be operated in a constant condition independently of the used amount of ultrapure water. Therefore, the pressure of the supplied ultrapure water can be kept constant even when the used amount of ultrapure water varies.

Figure 5:
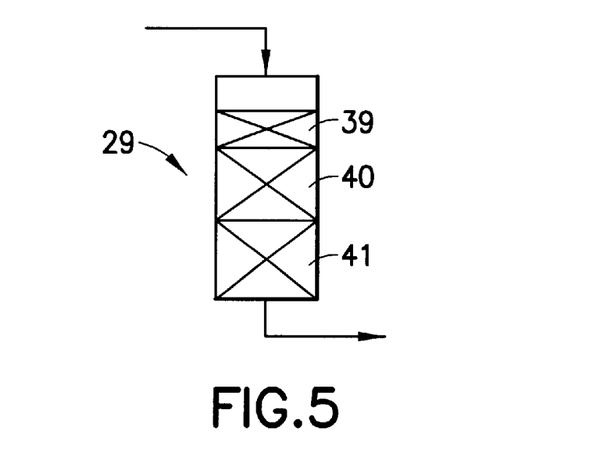
FIGS. 5 and 6 show flow diagrams of embodiments of (B) the catalytic reaction portion of the apparatus of the present invention.

FIG. 5 show a flow diagram of an embodiment of (B) the catalytic reaction portion of the apparatus of the present invention. In the present embodiment, a column for packing with a catalyst 29 is packed with a resin supporting palladium 39 a cation exchange resin 40 and an anion exchange resin 41 in this order as layers.

Figure 6:
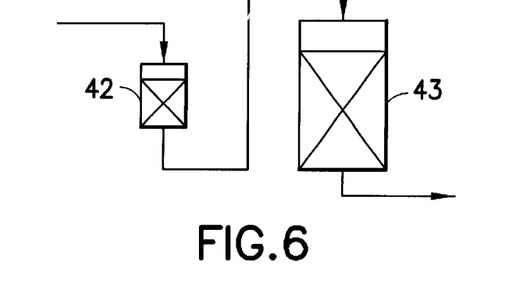

FIG. 6 show a flow diagram of another embodiment of (B) the catalytic reaction portion of the apparatus of the present invention. In the present embodiment, the column for packing with a catalyst comprises a column packed with a in supporting palladium 42 and a column of a mixed bed 43 containing cation exchange resin and an anion exchange resin. The two columns are connected in series in this order.

Figure 7:
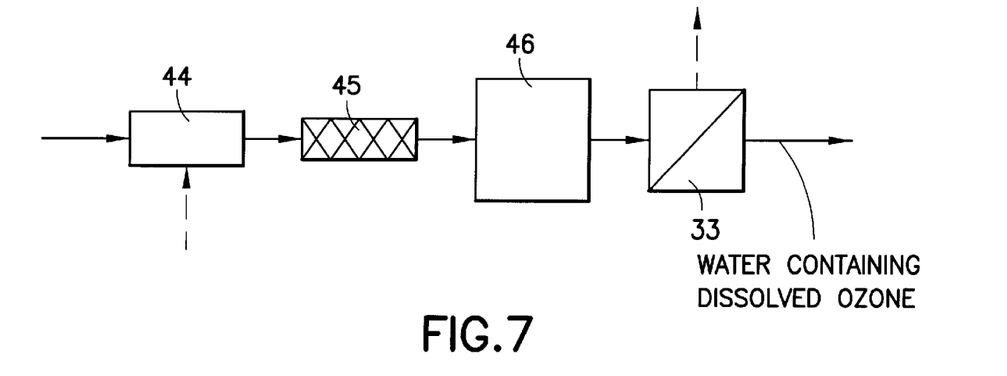
FIGS. 7 and 8 show flow diagrams of embodiments of (D) the apparatus for dissolving ozone of the apparatus of the present invention.

FIG. 7 shows a flow diagram of an embodiment of (D) the apparatus for dissolving ozone of the apparatus of the present invention. In the present embodiment ultrapure water and a gas containing ozone directly contact each other at an ejector 44 and the gas containing ozone is dispersed in ultrapure water as fine bubbles in an in-line mixer 45. The mixture of the gas and the liquid stays at a portion for promoting dissolution of ozone and growth of bubbles by combination 46. In this portion, dissolution of ozone proceeds and finely dispersed bubbles are combined again to form larger bubbles. The gas in an excessive amount is separated in a gas-liquid separator 33 and water containing dissolved ozone which does not contain bubbles can be obtained.

Figure 8:
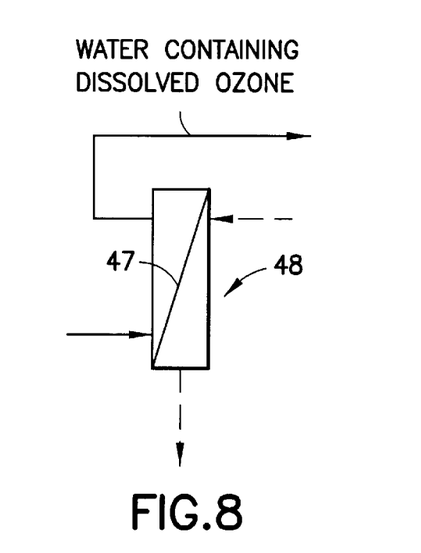

FIG. 8 shows a flow diagram of another embodiment of (D) the apparatus for dissolving ozone of the apparatus of the present invention. In the present embodiment, a module of a gas transmission membrane 48 equipped with a gas transmission membrane 47 made of a fluororesin and resistant to ozone is used and the gas containing ozone is dissolved into ultrapure water through the gas transmission membrane 47.

In the above embodiments, ultrapure water produced in the apparatus for producing ultrapure water is passed through the catalytic reaction portion disposed at the upstream of the apparatus for dissolving ozone and substances promoting decomposition of ozone are removed. In the present invention, it is sufficient that the substances promoting decomposition of ozone are not present in ultrapure water supplied to the apparatus for dissolving ozone. Therefore, the catalytic reaction portion may be disposed within the apparatus for producing ultrapure water.

As another embodiment of the present invention, in an apparatus for producing water containing dissolved ozone in which ultrapure water produced in an apparatus for producing ultrapure water having an apparatus for irradiating with ultraviolet light is supplied to an apparatus for dissolving ozone via a piping for supplying ultrapure water and ozone is dissolved into the ultrapure water, a catalytic reaction portion is disposed at the downstream of the apparatus for irradiating with ultraviolet light and a filtration apparatus is disposed at the downstream of the catalytic reaction portion.

The above embodiment will be described specifically in the following.

Figure 9A:
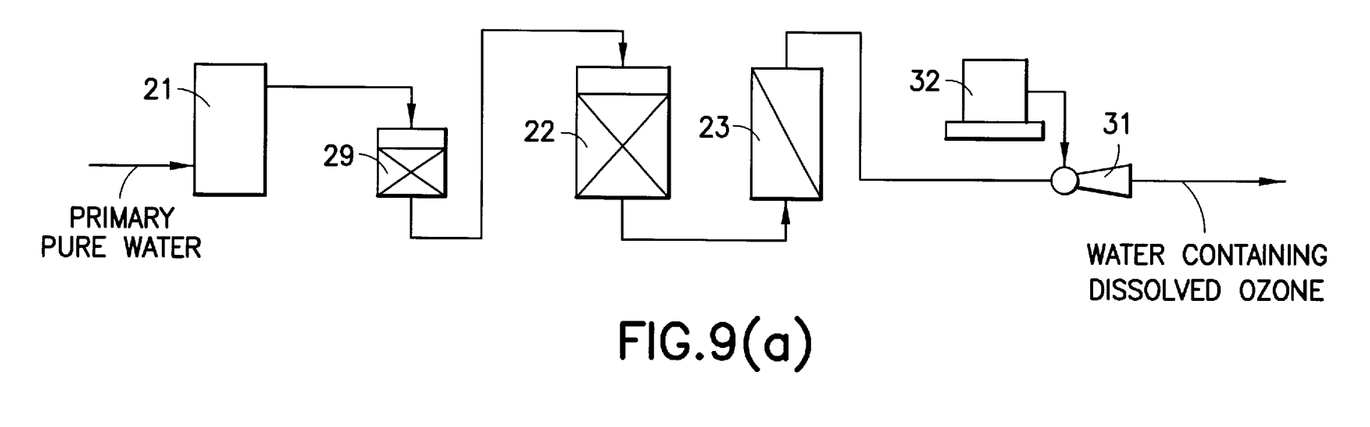
Figure 9B:
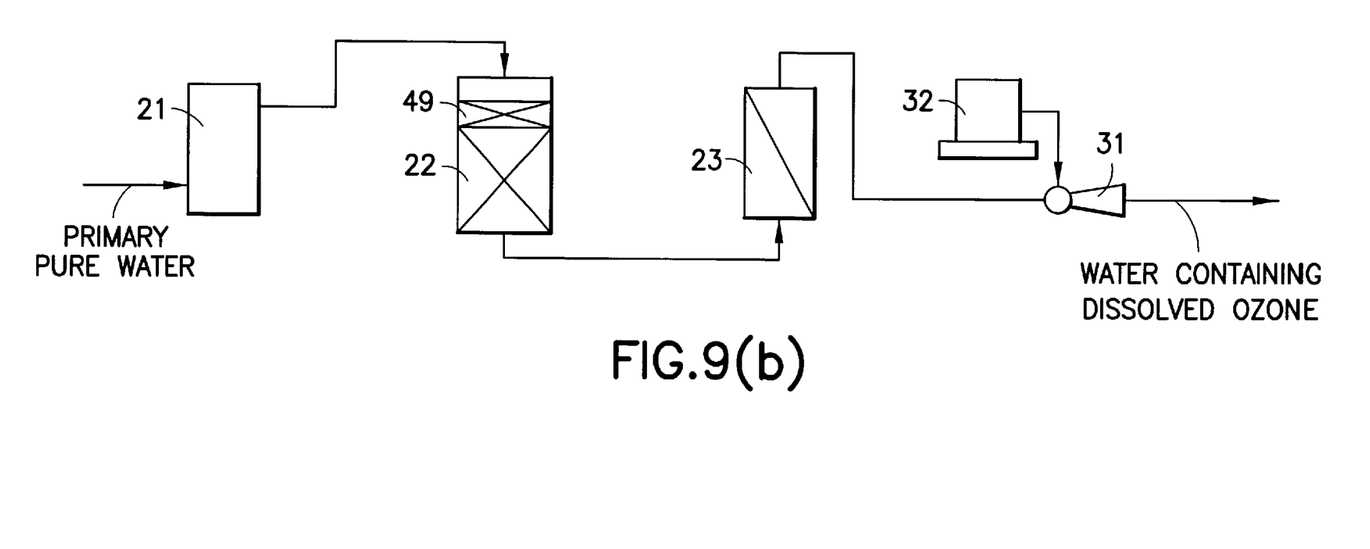

FIG. 9(*a*) and FIG. 9(*b*) show flow diagrams of embodiments of the apparatus of the present invention in which a catalytic reaction portion and a filtration apparatus are disposed as subsystems. In the embodiment shown in FIG. 9(*a*), in an ordinary subsystem comprising an apparatus for irradiating with ultraviolet light 21, an apparatus for ion exchange of the mixed bed type 22 and an ultrafiltration apparatus 23, a catalytic reaction portion 29 is disposed at the downstream of the apparatus for irradiating with ultraviolet light 21. Primary pure water is irradiated with ultraviolet light in the apparatus for irradiating with ultraviolet light 21 and introduced into the catalytic reaction portion 29 packed with an oxidation-reduction catalyst, the apparatus for ion exchange of the mixed bed type 22 and the ultrafiltration apparatus 23 and ultrapure water is obtained. In accordance with this process, even when substances promoting decomposition of ozone are formed by irradiation with ultraviolet light in the apparatus for irradiating with ultraviolet light 21, such substances are removed in the catalytic reaction portion 29 at the downstream of the apparatus for irradiating with ultraviolet light. Even when fine particles derived from the catalyst or the ion exchange resins are formed, such fine particles are remove by the ultrafiltration apparatus 23 at the final stage of the subsystem. In this manner, ultrapure water which does not contain substances promoting decomposition of ozone is supplied from the subsystem to the apparatus for dissolving ozone 31. A gas containing ozone produced in an apparatus for generating ozone 32 is dissolved into the ultrapure water in the apparatus for dissolving ozone 31 and water containing dissolved ozone is produced.

FIG. 9(*b*) shows a flow diagram of another embodiment of the apparatus for producing water containing dissolved ozone of the present invention. In the present embodiment, a portion above an ion exchange resin in an apparatus of ion exchange resin of the mixed bed type is packed with an oxidation-reduction catalyst 49. Primary pure water is irradiated with ultraviolet light in an apparatus for irradiating with ultraviolet light 21, introduced into the apparatus of ion exchange resin of the mixed bed type, brought into contact with the oxidation-reduction catalyst 49, subjected to the ion exchange treatment and treated by an ultrafiltration apparatus 23 and ultrapure water is obtained. A gas containing ozone produced in an apparatus for generating ozone 32 is dissolved into the ultrapure water in the apparatus for dissolving ozone 31 and water containing dissolved ozone is produced.

Between the embodiments shown in FIGS. 9(*a*) and 9(*b*), the embodiment shown in FIG. 9(*b*) in which the oxidation-reduction catalyst and the ion exchange resin for removing ions are placed into the same column is more preferable since it is not necessary that the column packed with the catalyst is separately disposed. When the oxidation-reduction catalyst and the ion exchange resin for removing ions are placed into the same column, the oxidation-reduction catalyst may be placed above the ion exchange resin as shown in FIG. 9(*b*) or below the ion exchange resin. The oxidation-reduction catalyst and the ion exchange resin may also be placed into the column as a mixture.

In the apparatus of the embodiments shown in FIGS. 9(*a*) and 9(*b*) in which the ultrafiltration apparatus is disposed at the down stream of the reaction portion packed with the oxidation-reduction catalyst, fine particles can be captured and removed even when fine particles are formed from the oxidation-reduction catalyst.

By using the apparatus for producing water containing dissolved ozone of the present invention, substances which are contained in ultrapure water in very small amounts and promote decomposition of ozone are removed and fine particles which may be formed from the pump, the resin supporting the catalyst and the ion exchange resins are also removed. Therefore, the decrease in the concentration of ozone is small even when water containing dissolved ozone is transported for a long distance and a high quality water containing dissolved ozone which has a great residual fraction of ozone dissolved in water and does not contain ions or fine particles can be obtained.

EXAMPLES

The present invention will be described more specifically with reference to examples in the following. However, the present invention is not limited to the examples.

Comparative Example 1

In accordance with a conventional process using a subsystem equipped with an apparatus for irradiating with ultraviolet light, a column of ion exchange resins of the mixed bed type and an ultrafiltration apparatus, 10 m$^3$/hour of primary pure water having a concentration of TOC of 2.0 μg/liter was treated and ultrapure water having a concentration of TOC of 0.5 μg/liter was obtained. In the used apparatus, the apparatus for irradiation with ultraviolet light [manufactured by NIPPON PHOTOSCIENCE Co., Ltd,; AUV-4800TC] had 24 ultraviolet light lamps and the total consumption of electric power was 4 kW. The column of ion exchange resins of the mixed bed type was packed with 65 liters of a strongly basic anion exchange resin [manufactured by DOWEX Co., Ltd; 550A] and 35 liters of a strongly acidic cation exchange resin [manufactured by DOWEX Co., Ltd.; 650C].

The above ultrapure water in an amount of 1 m$^3$/hour was used for producing water containing dissolved ozone through a branched piping. A gas containing ozone which was prepared from oxygen gas by silent discharge and had a concentration of ozone of 160 g/m$^3$ in an amount of 125 liters/hour, which corresponds to 20 g/hour of ozone, was supplied to the ultrapure water through an ejector and water containing dissolved ozone was prepared. A sample of water containing dissolved ozone was taken from the piping for transporting water containing dissolved ozone at a position separated from the ejector by 50 m. The concentration of ozone in the sample was measured and found to be 5 mg/liter.

Example 1

The same procedures as those conducted in Comparative Example 1 were conducted except that 5 liters of an anion exchange resin supporting 1% by weight of palladium was placed in the uppermost portion of the column of ion exchange resins of the mixed bed type. The thickness of the layer of the resin supporting palladium was 5% of the thickness of the layer of the ion exchange resins.

The concentration of TOC of the obtained ultrapure water was 0.5 μg/liter, which was the same as that in Comparative Example 1. The concentration of ozone in water containing dissolved ozone which was taken at a position separated from the ejector by 50 m was 9 mg/liter.

Example 2

The same procedures as those conducted in Comparative Example 1 were conducted except that a column packed with 1 liter of the anion exchange resin supporting 1% by weight of palladium which was the same as that used in Example 1 and an ultrafiltration apparatus were disposed at the downstream of the branch point of the piping and 1 m$^3$/hour of the ultrapure water obtained from the subsystem used in Comparative Example 1 was passed through the column packed with the resin supporting palladium and the ultrafiltration apparatus.

The concentration of ozone in the water containing dissolved ozone which was taken as the sample at the position separated from the ejector by 50 m was 10 mg/liter.

It is shown by the results in Comparative Example and Examples 1 and 2 that a high quality water containing dissolved ozone could be obtained by disposing the column packed with the anion exchange resin supporting palladium at the upstream of the apparatus for dissolving ozone, bringing the ultrapure water into contact with the anion exchange resin supporting palladium and filtering the ultrapure water passed through the catalytic reaction portion using the filtration apparatus and that decomposition of ozone in the water containing dissolved ozone was suppressed and the residual fraction of ozone was great even after transportation for a long distance.

INDUSTRIAL APPLICABILITY

By using the apparatus for producing water containing dissolved ozone of the present invention, substances which are contained in the ultrapure water in very small amounts and promote decomposition of ozone are removed and fine particles which may be formed from the pump, the resin supporting the catalyst and the ion exchange resins are also removed. Therefore, the decrease in the concentration of ozone is small even when water containing dissolved ozone is transported for a long distance and a high quality water containing dissolved ozone which has a great residual fraction of ozone dissolved in water and does not contain ions or fine particles can be obtained. The amount of ozone required for producing water containing dissolved ozone can be decreased.

What is claimed is:

1. An apparatus for producing water containing dissolved ozone which comprises (A) a piping for supplying ultrapure water through which ultrapure water is supplied, (B) a catalytic reaction portion which is connected with the piping for supplying ultrapure water and in which the ultrapure water is brought into contact with an oxidation-reduction catalyst, (C) a filtration apparatus by which the ultrapure water treated in the catalytic reaction portion is filtered and (D) an apparatus for dissolving ozone in which ozone is dissolved into the ultrapure water discharged from the filtration apparatus.

2. An apparatus for producing water containing dissolved ozone according to claim 1, wherein the ultrapure water supplied through the piping for supplying ultrapure water is ultrapure water produced in an apparatus for producing ultrapure water which is equipped with an apparatus for irradiating with ultraviolet light.

3. An apparatus for producing water containing dissolved ozone according to claim 1, wherein the oxidation-reduction catalyst is a catalyst containing supported palladium.

4. An apparatus for producing water containing dissolved ozone according to claim 1, wherein the catalytic reaction portion is a column packed with the catalyst.

5. An apparatus for producing water containing dissolved ozone according to claim 1, wherein the filtration apparatus is an apparatus equipped with an ultrafiltration membrane, a microfiltration membrane or a reverse osmosis membrane.

6. An apparatus for producing water containing dissolved ozone according to claim 1, wherein the apparatus for dissolving ozone is an apparatus equipped with an ejector.

7. An apparatus for producing water containing dissolved ozone which comprises an apparatus for producing ultrapure water which is equipped with an apparatus for irradiating with ultraviolet light, an apparatus for dissolving ozone in which ozone is dissolved into the ultrapure water produced in the apparatus for producing ultrapure water and a catalytic reaction portion which is packed with an oxidation-reduction catalyst and disposed between the apparatus for irradiating with ultraviolet light and the apparatus for dissolving ozone.

8. An apparatus for producing water containing dissolved ozone according to claim 7, wherein the oxidation-reduction catalyst is a catalyst containing supported palladium.

9. An apparatus for producing water containing dissolved ozone according to claim 7, wherein the catalytic reaction portion is a column packed with the catalyst.

10. An apparatus for producing water containing dissolved ozone according to claim 7, wherein the apparatus for dissolving ozone is an apparatus equipped with an ejector.

11. An apparatus for producing water containing dissolved ozone according to claim 4, wherein the column packed with the catalyst is further packed with ion exchange resins in combination with the oxidation-reduction catalyst.

12. An apparatus for producing water containing dissolved ozone according to claim 4, wherein a column for ion exchange is disposed between the column packed with the catalyst and the filtration apparatus.

13. An apparatus for producing water containing dissolved ozone according to claim 9, wherein the column packed with the catalyst is further packed with ion exchange resins in combination with the oxidation-reduction catalyst.

14. An apparatus for producing water containing dissolved ozone according to claim 9, wherein a column for ion exchange is disposed between the column packed with the catalyst and the filtration apparatus.

15. A method for producing water containing dissolved ozone which comprises (a) bringing ultrapure water into contact with an oxidation-reduction catalyst, (b) filtering the ultrapure water from step (a) and (c) dissolving ozone into the ultrapure water from step (b).

16. A method for producing water containing dissolved ozone according to claim 15, wherein the ultrapure water in step (a) is ultrapure water which is irradiated with ultraviolet light.

17. A method for producing water containing dissolved ozone according to claim 15, wherein the oxidation-reduction catalyst is a catalyst containing supported palladium.

18. A method for producing water containing dissolved ozone according to claim 15, wherein step (a) is carried out in a column packed with the catalyst.

19. A method for producing water containing dissolved ozone according to claim 15, wherein the filtering in step (b) is carried out in a filtration apparatus equipped with an ultrafiltration membrane, a microfiltration membrane or a reverse osmosis membrane.

20. A method for producing water containing dissolved ozone according to claim 15, wherein step (c) is carried out in an apparatus equipped with an ejector.

21. A method for producing water containing dissolved ozone according to claim 18, wherein the column packed with the catalyst is further packed with ion exchange resins in combination with the oxidation-reduction catalyst.

22. A method for producing water containing dissolved ozone according to claim 18, which further comprises passing the ultrapure water through an ion exchange after step (b) and before step (c).

* * * * *